United States Patent
Nair (10) Patent No.: US 10,743,205 B2
(45) Date of Patent: Aug. 11, 2020

(54) ISOLATING FALSE BASE STATIONS IN COMMUNICATION SYSTEMS

(71) Applicant: Nokia Technologies Oy, Espoo (FI)

(72) Inventor: Suresh P. Nair, Whippany, NJ (US)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 16/178,211

(22) Filed: Nov. 1, 2018

(65) Prior Publication Data

US 2020/0145859 A1    May 7, 2020

(51) Int. Cl.
*H04W 24/10* (2009.01)
*H04W 36/08* (2009.01)
*H04W 12/12* (2009.01)
*H04W 84/04* (2009.01)

(52) U.S. Cl.
CPC .......... *H04W 24/10* (2013.01); *H04W 12/12* (2013.01); *H04W 36/08* (2013.01); *H04W 84/042* (2013.01)

(58) Field of Classification Search
CPC .................................................... H04W 24/10
USPC ........................................................ 370/329
See application file for complete search history.

(56) References Cited

U.S. PATENT DOCUMENTS

| 2005/0208943 | A1* | 9/2005 | Pecen | H04W 36/0066 |
| | | | | 455/436 |
| 2011/0294527 | A1* | 12/2011 | Brueck | H04W 36/0061 |
| | | | | 455/466 |
| 2012/0307630 | A1* | 12/2012 | Markwart | H04L 41/08 |
| | | | | 370/228 |
| 2013/0183975 | A1* | 7/2013 | Hyun | H04W 36/22 |
| | | | | 455/436 |
| 2016/0309332 | A1* | 10/2016 | Norrman | H04W 12/12 |
| 2016/0381720 | A1* | 12/2016 | Baek | H04W 76/12 |
| | | | | 370/329 |

(Continued)

FOREIGN PATENT DOCUMENTS

| CN | 108124262 A | 6/2018 |
| EP | 3258719 A1 | 12/2017 |

(Continued)

OTHER PUBLICATIONS

3GPP, "3rd Generation Partnership Project; Technical Specification Group Services and System Aspects; System Architecture for the 5G System; Stage 2 (Release 15)," 3GPP TS 23.501, V15.2.0, Jun. 2018, 217 pages.

(Continued)

*Primary Examiner* — Peter G Solinsky
(74) *Attorney, Agent, or Firm* — Ryan, Mason & Lewis, LLP (57) ABSTRACT

A measurement report is sent from user equipment in a communication system to a serving base station in a serving cell of the communication system, wherein the measurement report comprises one or more signal measurements obtained by the user equipment for one or more other base stations in the communication system. A base station removal list is received at the user equipment from the serving base station which lists any base stations from the measurement report that failed a set-up procedure and are thus potentially false base stations. Any base stations in the base station removal list are removed from consideration by the user equipment as a target base station for a handover procedure.

26 Claims, 4 Drawing Sheets

(56) References Cited

U.S. PATENT DOCUMENTS

2018/0367998 A1* 12/2018 Kunz .................. H04W 12/12

FOREIGN PATENT DOCUMENTS

GB           2560357 A    9/2018
WO  PCT/FI2019/050752    1/2020

OTHER PUBLICATIONS

3GPP, "3rd Generation Partnership Project; Technical Specification Group Services and System Aspects; Security Architecture and Procedures for 5G System (Release 15)," 3GPP TS 33.501, V15.1.0, Jun. 2018, 152 pages.

3GPP, "3rd Generation Partnership Project; Technical Specification Group Services and System Aspects; Study on the Security Aspects of the Next Generation System (Release 14)," 3GPP TR 33.899, V1.3.0, Aug. 2017, 605 pages.

3GPP, "3rd Generation Partnership Project; Technical Specification Group Radio Access Network; NR; Radio Resource Control (RRC) Protocol Specification (Release 15)," 3GPP TR 38.331, V15.3.0, Sep. 2018, 445 pages.

3GPP, "3rd Generation Partnership Project; Technical Specification Group Services and System Aspects; Security Architecture and Procedures for 5G System (Release 15)," 3GPP TS 33.501, V15.2.0, Sep. 2018, 175 pages.

Machine-generated English translation of Chinese Application No. CN108124262A.

Intel Corporation, "3GPP TSG-RAN WG2 Meeting #107bis," RRS-1912722, Oct. 18, 2019, 5 pages.

* cited by examiner

ISOLATING FALSE BASE STATIONS IN COMMUNICATION SYSTEMS

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.2.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.1.0, entitled "Technical Specification Group Services and System Aspects; Security Architecture and Procedures for the 5G System" and 5G Technical Report (TR) 33.899, V1.3.0, entitled Technical Specification Group Services and System Aspects; Study on the Security Aspects of the Next Generation System," the disclosures of which are incorporated by reference herein in their entireties, further describe security management details associated with a 5G network.

Security management is an important consideration in any communication system. For example, protections in a 5G network against false bases stations, e.g., communication equipment or devices, operated by malicious actors, pretending to be legitimate base stations in a serving network, are critical to prevent such malicious actors from acquiring sensitive subscriber information that would allow them to, inter alia, act like a legitimate UE to the 5G network.

SUMMARY

Illustrative embodiments provide improved techniques for security management in communication systems particularly with respect to isolating false base stations.

For example, in one illustrative embodiment, a method comprises the following steps. A measurement report is sent from user equipment in a communication system to a serving base station in a serving cell of the communication system, wherein the measurement report comprises one or more signal measurements obtained by the user equipment for one or more other base stations in the communication system. A base station removal list is received at the user equipment from the serving base station which lists any base stations from the measurement report that failed a set-up procedure and are thus potentially false base stations. Any base stations in the base station removal list are removed from consideration by the user equipment as a target base station for a handover procedure.

In another illustrative embodiment, a method comprises the following steps. A measurement reporting message is sent from a serving base station in a serving cell of a communication system to user equipment in the communication system, wherein the measurement reporting message instructs the user equipment on measurement criteria for obtaining the one or more signal measurements associated with the one or more other base stations. A measurement report is received at the serving base station from the user equipment, wherein the measurement report comprises one or more signal measurements obtained for one or more other base stations in the communication system. The one or more signal measurements for the one or more other base stations from the measurement report are compared at the serving base station to at least one threshold. An inter base station link set-up procedure for any of the one or more other base stations for which the corresponding signal measurement reaches or exceeds the threshold is initiated at the serving base station. A base station removal list is sent from the serving base station to the user equipment, wherein the list comprises any base stations for which the link set-up procedure failed and are thus potentially false base stations.

One or more illustrative embodiments are implemented in a roaming scenario involving multiple communication networks (e.g. visited and home public land mobile networks).

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501, 3GPP TS 33.501, and 3GPP TR 33.899. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
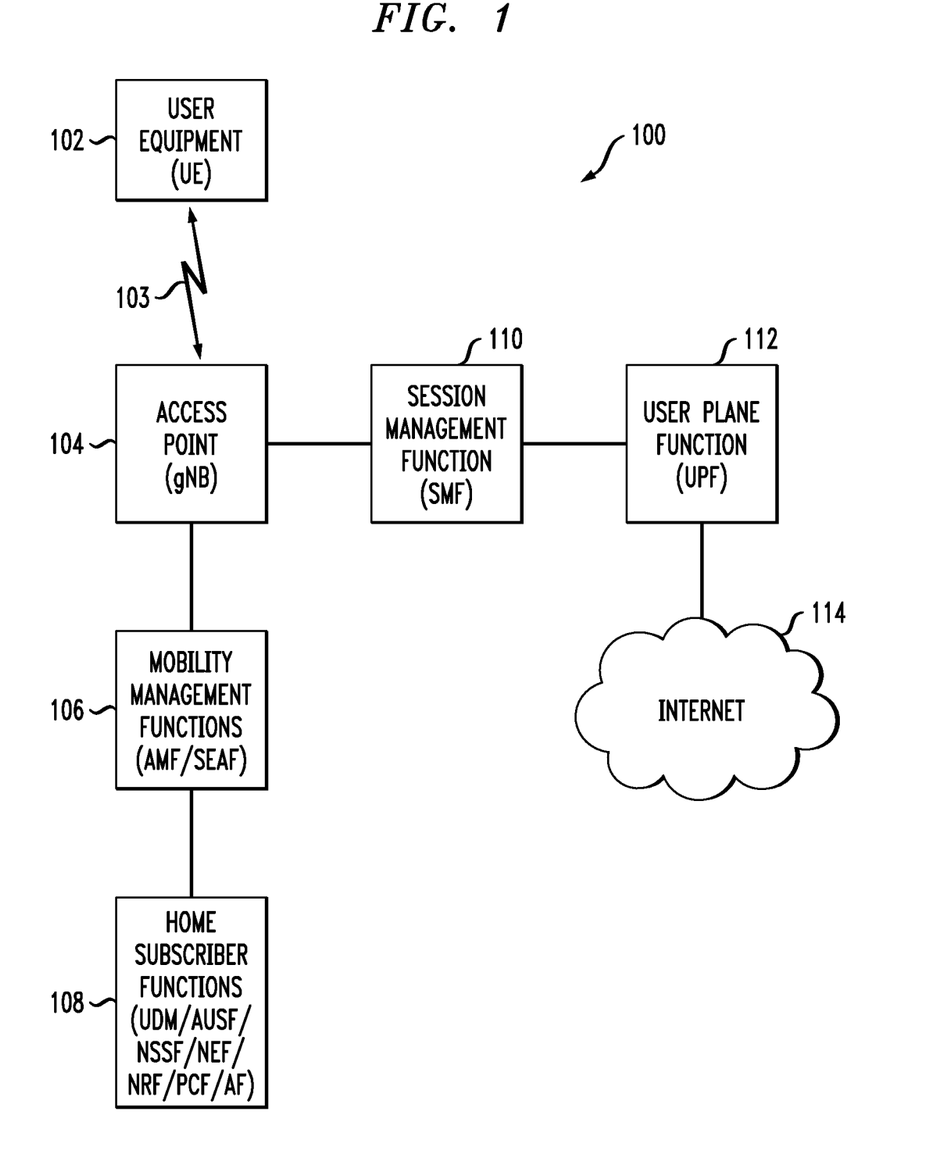
FIG. 1 illustrates a communication system with which one or more illustrative embodiments are implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), Policy Control Function (PCF), and Application Function (AF).

One important point to note is that in an SBA communication system, such as a 5G system, the control plane uses a services model approach in which components (NFs) query the NRF to discover and communicate with each other over application programming interfaces (APIs). The NF services discovery and authorization method will be described in further detail below.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of Protocol Data Unit (PDU) sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
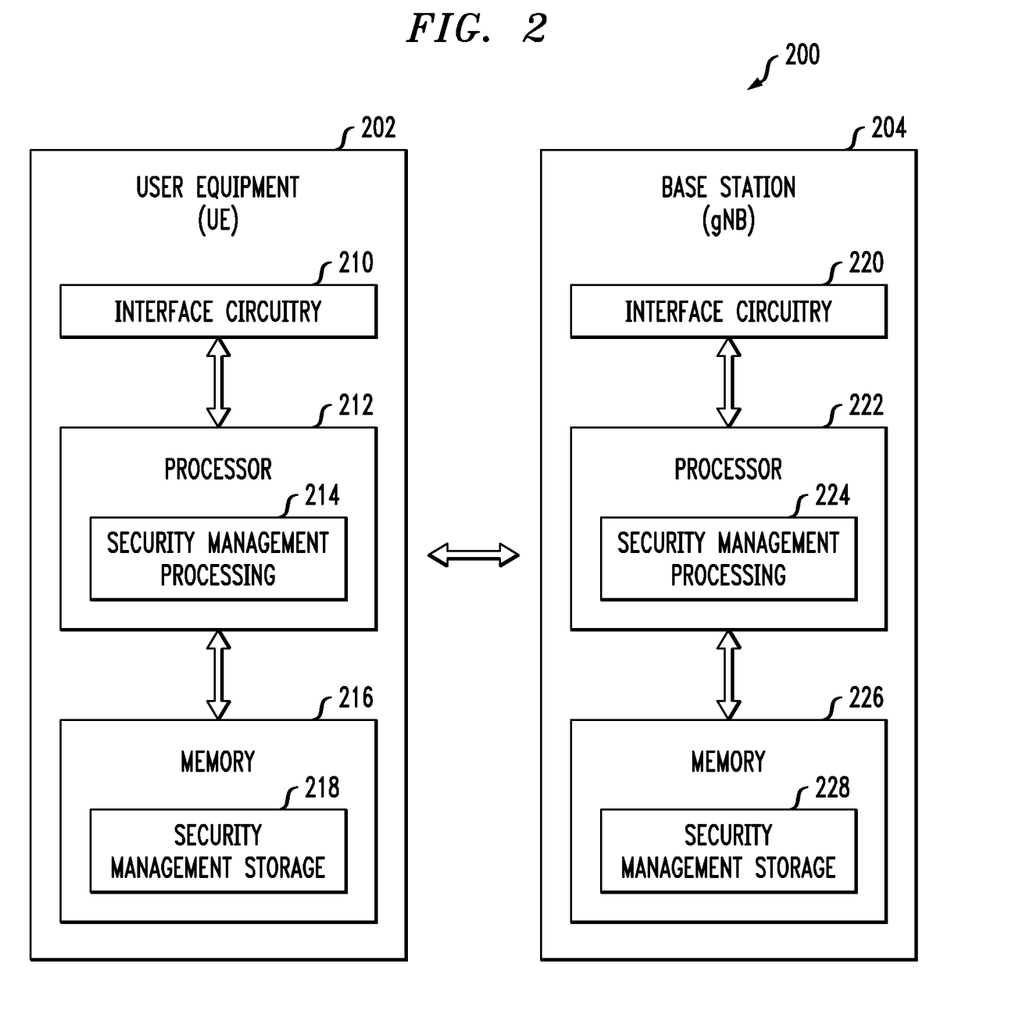
FIG. 2 illustrates user equipment and a base station configured for providing security management with which one or more illustrative embodiments are implemented.

FIG. 2 is a block diagram of user equipment and a base station configured for providing security management in an illustrative embodiment. More particularly, system 200 is shown comprising user equipment 202 and a base station 204.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with FIGS. 3 and 4 below and elsewhere herein. The memory 216 of the user equipment 202 includes a security management storage module 218 that stores data generated or otherwise used during security management operations.

The base station 204 comprises a processor 222 coupled to a memory 226 and interface circuitry 220. The processor 222 of the base station 204 includes a security management processing module 224 that may be implemented at least in part in the form of software executed by the processor 222. The processing module 224 performs security management described in conjunction with FIGS. 3 and 4 below and elsewhere herein. The memory 226 of the base station 204 includes a security management storage module 228 that stores data generated or otherwise used during security management operations.

The respective processors 212 and 222 of user equipment 202 and base station 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The respective memories 216 and 226 of user equipment 202 and base station 204 may be used to store one or more software programs that are executed by the respective processors 212 and 222 to implement at least a portion of the functionality described herein. For example, security management operations and other functionality as described in conjunction with FIG. 3 below and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The respective interface circuitries 210 and 220 of user equipment 202 and base station 204 illustratively comprise transceivers or other communication hardware or firmware that allows the associated system elements to communicate with one another in the manner described herein.

It is apparent from FIG. 2 that user equipment 202 is configured for communication with base station 204 and vice-versa via their respective interface circuitries 210 and 220. This communication involves user equipment 202 sending data to the base station 204, and base station 204 sending data to user equipment 202. However, in alternative embodiments, other network elements may be operatively coupled between, as well as to, user equipment 202 and base station 204. The term "data" as used herein is intended to be construed broadly, so as to encompass any type of information that may be sent between user equipment and a base station including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, user equipment and base stations can be configured to incorporate additional or alternative components and to support other communication protocols.

Other elements in a 5G network may each also be configured to include components such as a processor, memory and network interface. These elements need not be implemented on separate stand-alone processing platforms, but could instead, for example, represent different functional portions of a single common processing platform.

As mentioned above, protections in a 5G network against false bases stations is an important security management issue. Recall that false base stations are typically communication equipment or devices, operated by malicious actors, pretending to be legitimate base stations in a serving network.

Proposals that attempt to address this issue have been mentioned in the above-referenced TR 33.899. Further, a measurement-based solution is mentioned in the above-referenced TS 33.501 annex E.1. The solution mentions that measurement reports collected from multiple UEs can be used to filter out incorrect reports sent by a potential rogue UE. Upon detection of a false base station, the operator can take further actions, e.g., informing legal authorities or contacting the victim UE. However, this is not a practical solution to prevent active attacks on the UEs. The approach mentioned in TS 33.501 is a static, after-the-fact, solution.

Illustrative embodiments overcome drawbacks associated with previous approaches for isolating false base stations. More particularly, illustrative embodiments actively isolate false base stations in the network. As will be illustrated and further described below in the context of FIG. 3, one or more illustrative embodiments provide a procedure, as follows. Active UEs connected to a serving base station, periodically send measurement reports about neighbor base stations. A "neighbor" base station is a base station in relatively close geographic proximity to another base station. Typically, neighbor base stations are considered when making a handover decision from a current serving base station to a target base station. UEs typically measure a received signal strength indicator (RSSI) and other radio parameters instructed by the serving base station. RSSI is an indication of the power level being received by a radio typically after antenna and possible cable loss. Therefore, the higher the RSSI number, the stronger the signal. Potential target base stations for handover during mobility are selected, based on the threshold values for the signal (such as RSSI and/or other parameters) from the list of neighbor base stations.

The serving base station configures the UE for measurement reporting as specified in 5G Technical Specification (TS) 38.331, V15.3.0, entitled "Technical Specification Group Radio Access Network; NR; Radio Resource Control (RRC) Protocol Specification," the disclosure of which is incorporated by reference herein in its entirety, clause 5.5 by sending a measConfig list. In general, the serving base station sends the UE:

(i) Measurement objects: The objects on which the UE shall perform the measurements.

(ii) Reporting configurations: A list of reporting configurations where each reporting configuration consists of reporting criteria and reporting format.

(iii) Measurement identities: A list of measurement identities where each measurement identity links one measurement object with one reporting configuration.

(iv) Quantity configurations: One quantity configuration is configured per radio access technology (RAT) type.

(v) Measurement gaps: Periods that the UE may use to perform measurements, i.e. no (uplink or UL, downlink or DL) transmissions are scheduled.

Before the handover, the UE normally measures the cell power (signal quality) of the target cell and reports it to the network, so that the network can decide whether to allow the UE to handover to the target cell or not based on the measurements. Target cell refers to a part of the communication network, typically defined by a geographic region, served by the target base station. Thus, in a handover, a serving cell (cell served by the serving or current base station) seeks to enable transfer of a UE to a target cell.

If the serving cell selects a target cell based on measurements, the serving base station, tries to prepare the target cell for handover. This is accomplished by trying to establish an inter-cell or inter-eNB or inter-gNB X2 or Xn link set-up using the landline Internet Protocol (IP) network between the base stations belonging to the PLMN operator.

If the target base station is a false base station, it is most likely broadcasting the same public land mobile network (PLMN) identifier (ID) and cell ID, which is spoofed from the real operator network. When a real base station belonging to the PLMN operator tries to set up an X2 or Xn link with such base stations reported by the UE, such a link set up will fail, because the false base station will not be connected to the IP network of the PLMN operator.

Thus, when the X2 or Xn link set-up fails with a target gNB, it is a clear indication that such base stations do not belong to the serving PLMN network, at a minimum. It is possible that the X2 or Xn set-up may fail for other reasons also, but whether a reported target base station belongs to the PLMN operator or not can be verified by a configuration check of the neighbor list of base stations typically configured in every base station.

Hence, for whatever reason, if a serving base station fails to set up the X2 or Xn link with a neighboring base station reported by the UE, illustrative embodiments instruct the UE to remove such a base station from the measurement list. In one embodiment, this instruction is conveyed by the serving base station sending the UE a measObjectToRemoveList. The UE removes the indicated base station from the potential target list and further measurements. The current definition in the above-referenced TS 38.331 for measObjectToRemoveList is a "Mist of measurement objects to remove. Field measObjectToRemoveListExt includes additional measurement object identities, i.e., extends the size of the measurement object identity list using the general principles specified in 5.1.2."

Though this removes cells indicated in the measObjectToRemoveList from the measurement and potential target, it can be further enhanced by adding a specification that such list of Objects (i.e., Cell IDs) which were instructed to be removed by the serving base station, shall not be autonomously selected by the UE for handover. Hence, illustrative embodiments isolate false base stations from active UEs and prevent UEs from handing over to them. This avoids the need for contacting victim UEs, as with the existing measurement-based approach, since illustrative embodiments are preventing UEs from being victimized in the first place.

Furthermore, it is to be appreciated that UEs may enter into "idle mode" from an active state where they were connected to a valid cell/base station. In the base station where the UE was connected and active, the UE received a measurement configuration message, indicating the valid neighboring cells belonging to the PLMN. Hence, if the UE is moving around, the UE can use this list as a list of valid cells belonging to the operator. In the idle mode cell re-selection procedure, one of the cells belonging to this list can be selected. As the UE moves out of the coverage area, the neighbor list broadcasted by any one of the cells in the original list received by the UE can be considered trustworthy. As the UE moves around, the UE will encounter fresh cell ID/base stations. To help such mobile UEs determine base stations belonging to a real operator or false operator, the UE can verify whether the base station/cell ID is included in the neighbor list broadcasted by a previously trusted base station.

Figure 3:
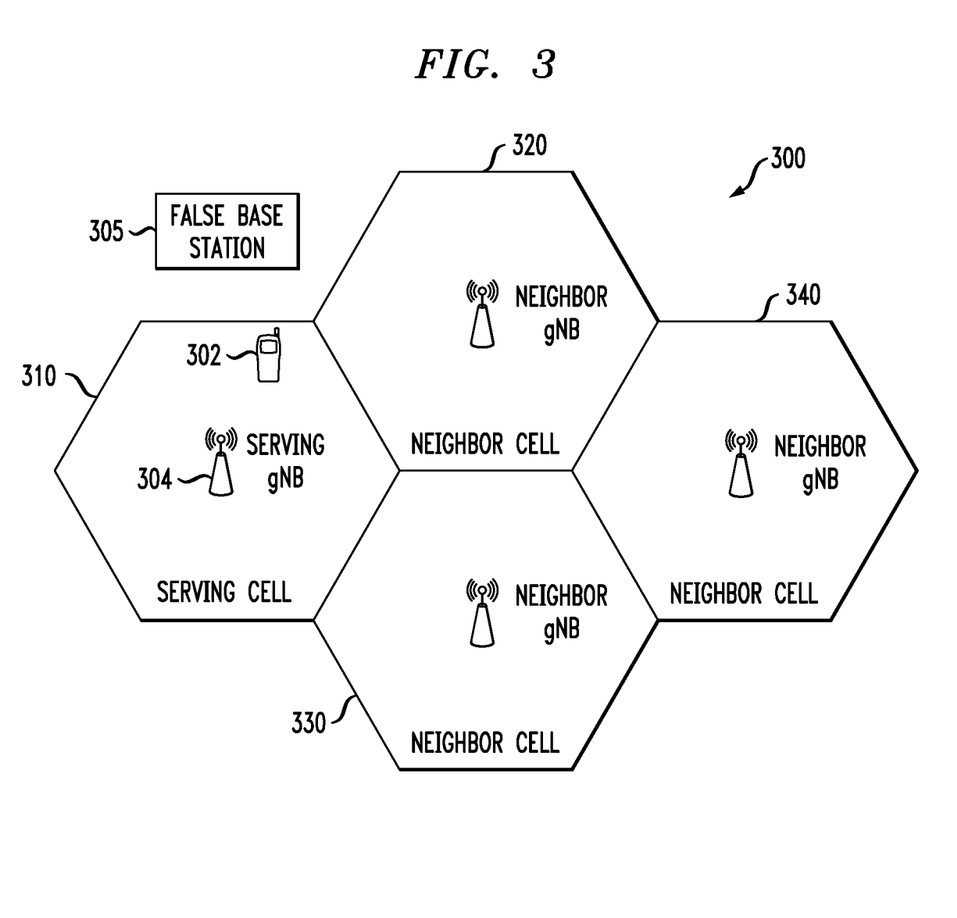
FIG. 3 illustrates multiple neighbor cells in a communication system with which one or more illustrative embodiments are implemented.
Figure 4:
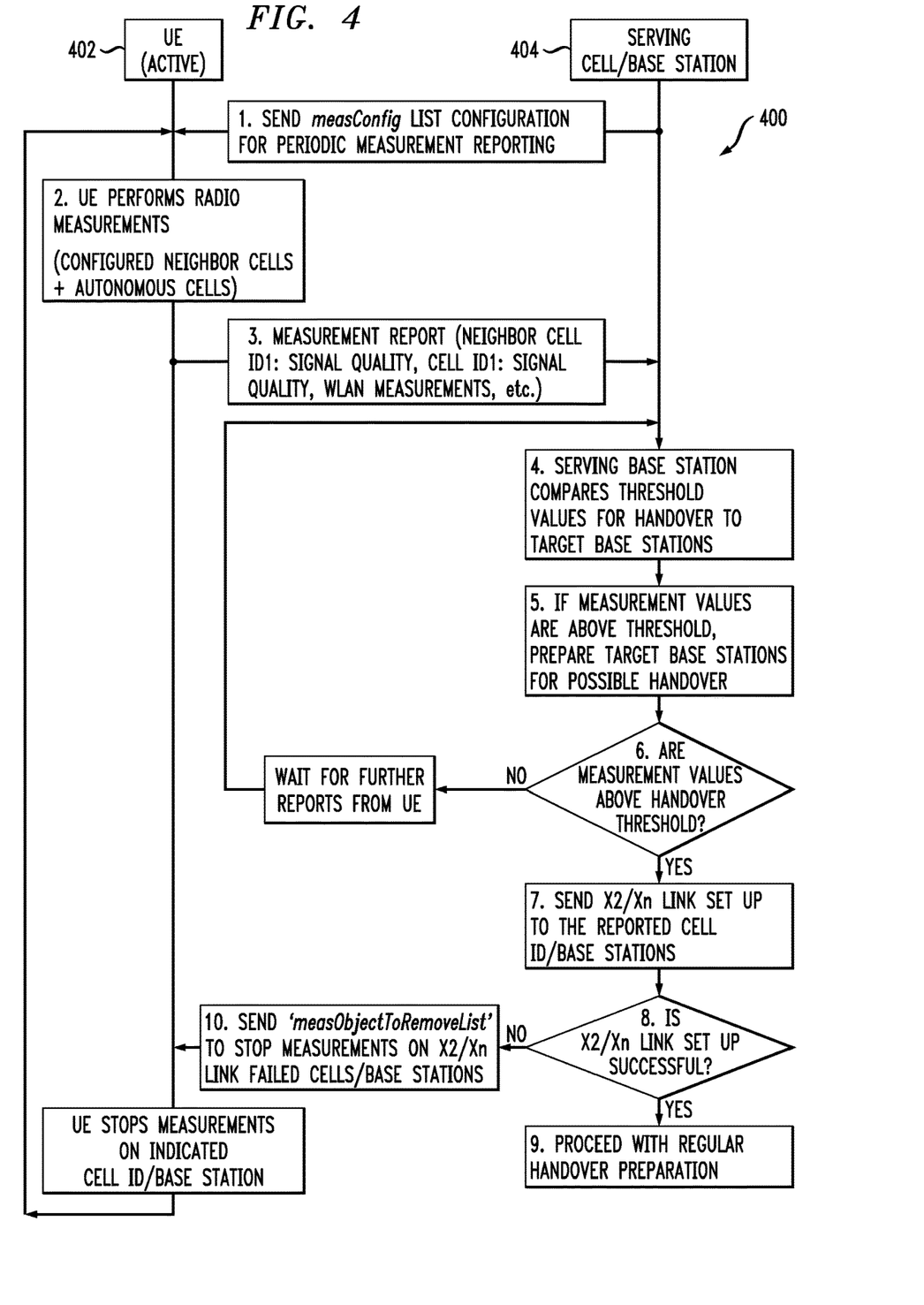
FIG. 4 illustrates a methodology for security management between user equipment and a base station to isolate false base stations, according to another illustrative embodiment.

To visually facilitate a complete understanding of illustrative embodiments, FIG. 3 illustrates multiple cells in a communication system (e.g., serving network such as a visited PLMN) with which one or more illustrative embodiments are implemented. More particularly, communication system 300 shows a plurality of cells 310, 320, 330 and 340, each with a base station (gNB) associated therewith. Assume that cell 310 is a serving cell for UE 302, and base station 304 is the serving base station for UE 302. Further assume that UE 302 needs to be handed over to another one of the cells in communication system 300. While there are several neighbor cells (320, 330 and 340) shown, each with a neighbor gNB, one of the cells and its gNB will be selected as a target cell/base station for the handover. However, as explained herein, it is to be understood that there could be one or more false base stations, e.g., false base station 305, trying to spoof UE 302 and/or communication system 300. False base station 305 can be any communication equipment or device, operated by malicious actors, pretending to be a legitimate base station in a serving network (communication system 300). In this operating environment, illustrative embodiments provide methods described herein for isolating false base station 305. FIG. 4 depicts an example of such a methodology.

FIG. 4 illustrates a methodology for security management between user equipment and a base station to isolate false base stations, according to another illustrative embodiment. More particularly, methodology 400 illustrates operations of a UE 402 and a serving base station (serving cell) 404, and message flow therebetween, to isolate one or more false base stations as described above.

In step 1, serving base station 404 sends a measConfig list configuration message to UE 402 for periodic measurement reporting.

In step 2, UE 402 performs radio measurements for configured neighbor cells. In addition, UEs scan and measure cells autonomously selected based on their signal power.

In step 3, after making the radio measurements in step 2, UE 402 creates and sends a measurement report to serving base station 404. In one or more embodiments, the report contains information such as: Neighbor Cell ID1: signal quality; Cell ID1: signal quality; wireless local area network (WLAN) measurements; etc.

In step 4, serving base station 404 compares the received measurements against threshold values for handover to target base stations.

In steps 5 and 6, serving base station 404 determines if measurement values are above threshold values. If not, then the serving base station 404 waits for further measurement reports from UE 402. If measurement values are above threshold values, serving base station 404 prepares one or more target base stations for possible handover.

For example, in step 7, serving base station 404 sends one or more X2/Xn link set-up messages to reported cell ID/base stations.

In step 8, serving base station 404 determines whether X2/Xn link set-up is successful for the one or more target base stations.

If so, in step 9, serving base station 404 proceeds with a regular handover preparation for the target base station.

If one or more of the X2/Xn link set-ups are unsuccessful, then serving base station 404 identifies those base stations as potential false base stations and, in step 10, sends a measObjectToRemoveList message to UE 402 to stop measurements on the X2/Xn link failed cells/base stations.

UE 402 then stops measurements on the indicated cell ID/base stations.

In another illustrative embodiment, the base stations may decide to broadcast the cell IDs which are determined to be not genuine and do not belong to the genuine PLMN operator network as a blacklist of cells to be avoided for handover, measurements and cell re-selection in idle mode. When a UE goes idle after being active in a base station, it keeps the blacklist of base stations to be avoided for idle mode cell re-selection. The UE selects a cell which is not in the blacklist given to it by the genuine base station. Hence, the UE after one hop in the idle mode is connected to a genuine base station, e.g., base station 2. In base station 2, the UE further updates its blacklist of base stations to be avoided by the list given or broadcasted by the base stations station 2. If the UE moves further in idle mode, it updates its blacklist of base stations to be avoided continuously, hop by hop, using the blacklist broadcasted or sent by genuine base stations. Hence, UEs in idle mode avoid cell re-selection to false base stations by listening to the blacklist broadcast from genuine base stations.

The particular processing operations and other system functionality described in conjunction with the diagrams herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;
   at least one memory including computer code;
   the at least one memory and the computer code being configured to, with the at least one processor, cause the apparatus at least to:
      send a measurement report to a serving base station in a serving cell of a communication system, wherein the measurement report comprises one or more signal measurements obtained by user equipment for one or more base stations other than the serving base station in the communication system;
      receive a base station removal list from the serving base station which lists any base stations from the measurement report that failed an inter base station set-up procedure and are thus potentially false base stations; and
      remove any base stations in the base station removal list from consideration as a target base station for a handover procedure for the user equipment;
   wherein the inter base station set-up procedure comprises establishing a link on a public land mobile network (PLMN) of the serving base station.

2. The apparatus of claim 1, wherein the at least one memory and the computer code are further configured to, with the at least one processor, cause the apparatus at least to, prior to the sending the measurement report, receive a measurement reporting message from the serving base station, wherein the measurement reporting message comprises measurement criteria for obtaining the one or more signal measurements associated with the one or more other base stations.

3. The apparatus of claim 2, wherein the at least one memory and the computer code are further configured to, with the at least one processor, cause the apparatus at least to obtain the one or more signal measurements associated with the one or more other base stations for inclusion in the measurement report to be sent to the serving base station.

4. The apparatus of claim 2, wherein the measurement reporting message received from the serving base station contains a list of one or more other base stations in the communication system that are currently considered valid base stations.

5. The apparatus of claim 4, wherein the at least one memory and the computer code are further configured to, with the at least one processor, cause the apparatus at least to consult the list of one or more other base stations currently considered valid base stations during an idle mode cell re-selection procedure for the user equipment.

6. The apparatus of claim 2, wherein a broadcast message received from the serving base station contains a list of one or more other base stations in the communication system, the list indicating whether each of the one or more other base stations is currently considered a valid or an invalid base station.

7. The apparatus of claim 6, wherein the at least one memory and the computer code are further configured to, with the at least one processor, cause the apparatus at least to, while in idle mode, select only a valid base station hop by hop from the list of base stations in the broadcast message from the serving base station.

8. The apparatus of claim 1, wherein the one or more other base stations are at least one of: neighboring base stations with respect to the serving base station; and connected to each other in a hop by hop manner by being in a hop by hop neighbor list configured in each of the base stations.

9. The apparatus of claim 1, wherein the communication system is a public land mobile network visited by the user equipment.

10. The apparatus of claim 9, wherein the public land mobile network comprises a 5G system.

11. A method comprising:
    sending a measurement report to a serving base station in a serving cell of a communication system, wherein the measurement report comprises one or more signal measurements obtained by user equipment for one or more base stations other than the serving base station in the communication system;
    receiving a base station removal list at the user equipment from the serving base station which lists any base stations from the measurement report that failed a set-up procedure and are thus potentially false base stations; and
    removing any base stations in the base station removal list from consideration as a target base station for a handover procedure for the user equipment;
    wherein the inter base station set-up procedure comprises establishing a link on a public land mobile network (PLMN) of the serving base station.

12. The method of claim 11, further comprising, prior to the sending the measurement report, receiving a measurement reporting message from the serving base station, wherein the measurement reporting message comprises measurement criteria for obtaining the one or more signal measurements associated with the one or more other base stations.

13. The method of claim 12, further comprising obtaining the one or more signal measurements associated with the one or more other base stations for inclusion in the measurement report to be sent to the serving base station.

14. The method of claim 12, wherein the measurement reporting message received from the serving base station contains a list of one or more other base stations in the communication system, the list indicating whether each of the one or more other base stations is currently considered a valid or an invalid base station.

15. The method of claim 14, further comprising consulting the list of one or more other base stations currently considered valid base stations during an idle mode cell re-selection procedure for the user equipment.

16. The method of claim 15, further comprising updating the list of one or more other base stations currently considered valid base stations during an idle mode cell re-selection procedure by listening to broadcast messages from base stations considered valid based on a previous list.

17. The method of claim 11, wherein the one or more other base stations are at least one of: neighboring base stations with respect to the serving base station; and connected to each other in a hop by hop manner by being in a hop by hop neighbor list configured in each of the base stations.

18. The method of claim 11, wherein the communication system is a public land mobile network visited by the user equipment.

19. The method of claim 18, wherein the public land mobile network comprises a 5G system.

20. An article of manufacture comprising a non-transitory computer-readable storage medium having embodied therein executable program code that when executed by a processor operatively coupled to the computer-readable storage medium causes the processor to perform the steps of:
sending a measurement report to a serving base station in a serving cell of a communication system, wherein the measurement report comprises one or more signal measurements obtained by user equipment for one or more base stations other than the serving base station in the communication system;
receiving a base station removal list at the user equipment from the serving base station which lists any base stations from the measurement report that failed a set-up procedure and are thus potentially false base stations; and
removing any base stations in the base station removal list from consideration as a target base station for a handover procedure for the user equipment;
wherein the inter base station set-up procedure comprises establishing a link on a public land mobile network (PLMN) of the serving base station.

21. An apparatus comprising:
at least one processor;
at least one memory including computer code;
the at least one memory and the computer code being configured to, with the at least one processor, cause the apparatus at least to:
send a measurement reporting message to user equipment in a communication system, wherein the measurement reporting message instructs the user equipment on measurement criteria for obtaining one or more signal measurements associated with one or more base stations other than a serving base station for the user equipment in a serving cell of the communication system;
receive a measurement report from the user equipment, wherein the measurement report comprises the one or more signal measurements obtained for the one or more other base stations in the communication system;
compare the one or more signal measurements for the one or more other base stations from the measurement report to at least one threshold;
initiate a link set-up procedure for any of the one or more other base stations for which the corresponding signal measurement reaches or exceeds the threshold; and
send a base station removal list to the user equipment, wherein the list comprises any base stations for which the link set-up procedure failed and are thus potentially false base stations;
wherein the link set-up procedure comprises establishing a link on a public land mobile network (PLMN) of the serving base station.

22. The apparatus of claim 21, wherein the at least one memory and the computer code are further configured to, with the at least one processor, cause the apparatus at least to proceed with a handover procedure for the user equipment for one of the base stations for which the link set-up procedure succeeded.

23. The apparatus of claim 21, wherein the link set-up procedure comprises a link set-up procedure for one of the X2 interface and the Xn interface.

24. The apparatus of claim 21, wherein a base station for which the link set-up procedure fails is identified as a base station not belonging to the public land mobile network to which the serving base station belongs and is thus a potentially false base station.

25. A method comprising:
sending a measurement reporting message to user equipment in a communication system, wherein the measurement reporting message instructs the user equipment on measurement criteria for obtaining one or more signal measurements associated with one or more base stations other than a serving base station for the user equipment in a serving cell of the communication system;
receiving a measurement report from the user equipment, wherein the measurement report comprises the one or more signal measurements obtained for the one or more other base stations in the communication system;
comparing the one or more signal measurements for the one or more other base stations from the measurement report to at least one threshold;
initiating a link set-up procedure for any of the one or more other base stations for which the corresponding signal measurement reaches or exceeds the threshold; and
sending a base station removal list to the user equipment, wherein the list comprises any base stations for which the link set-up procedure failed and are thus potentially false base stations;
wherein the link set-up procedure comprises establishing a link on a public land mobile network (PLMN) of the serving base station.

26. An article of manufacture comprising a non-transitory computer-readable storage medium having embodied therein executable program code that when executed by a processor operatively coupled to the computer-readable storage medium causes the processor to perform the steps of:
sending a measurement reporting message to user equipment in a communication system, wherein the measurement reporting message instructs the user equipment on measurement criteria for obtaining one or more signal measurements associated with one or more base stations other than a serving base station for the user equipment in a serving cell of the communication system;

receiving a measurement report from the user equipment, wherein the measurement report comprises the one or more signal measurements obtained for the one or more other base stations in the communication system;

comparing the one or more signal measurements for the one or more other base stations from the measurement report to at least one threshold;

initiating a link set-up procedure for any of the one or more other base stations for which the corresponding signal measurement reaches or exceeds the threshold; and sending a base station removal list to the user equipment, wherein the list comprises any base stations for which the link set-up procedure failed and are thus potentially false base stations;

wherein the link set-up procedure comprises establishing a link on a public land mobile network (PLMN) of the serving base station.

\* \* \* \* \*